UNITED STATES PATENT OFFICE.

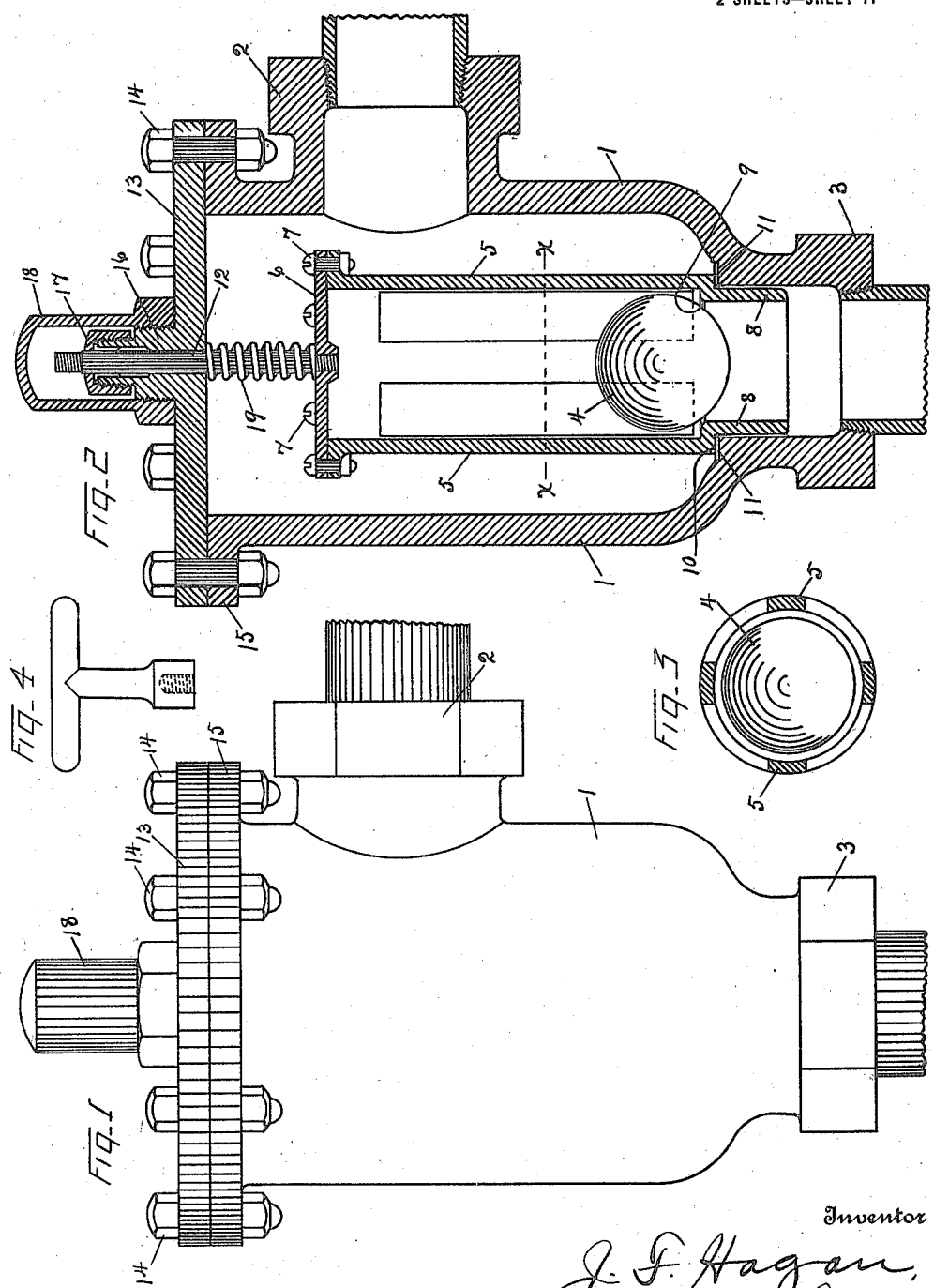

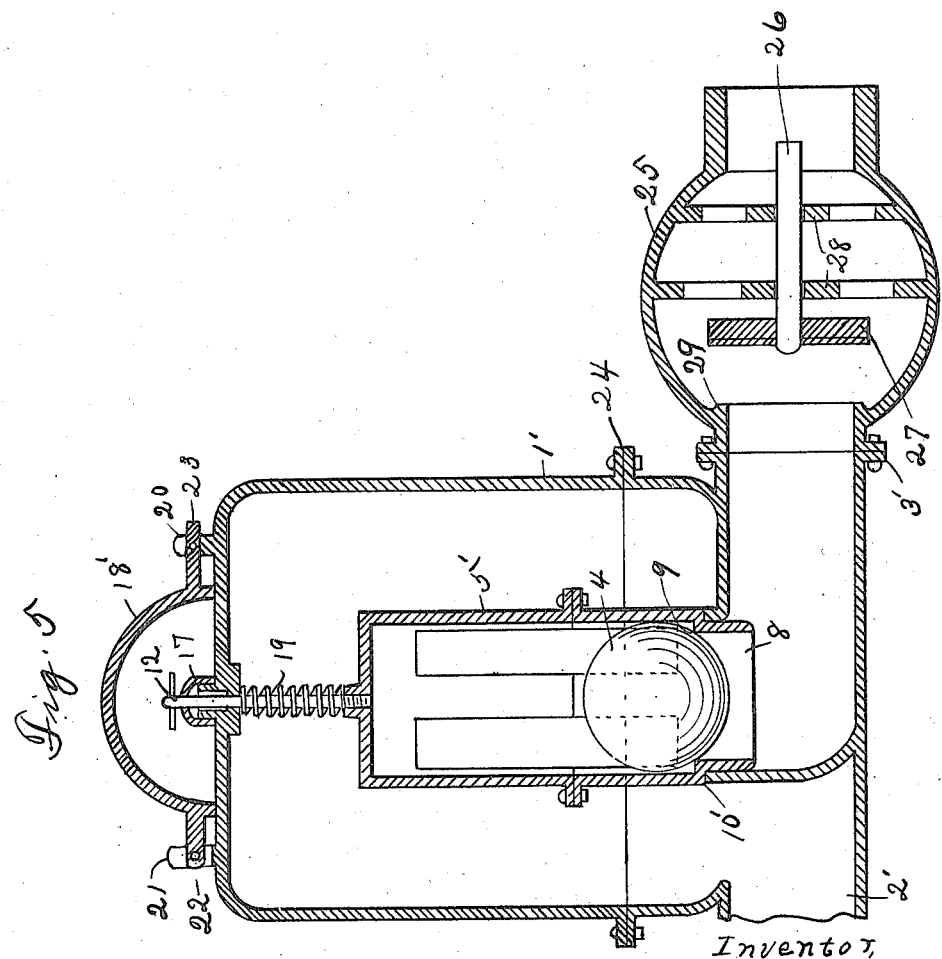

JOSEPH FRANCIS HAGAN, OF ELECTRA, TEXAS, ASSIGNOR OF ONE-HALF TO W. L. DALTON, OF WICHITA FALLS, TEXAS.

CUT-OFF VALVE FOR PIPE-LINES.

1,264,296.  Specification of Letters Patent.  Patented Apr. 30, 1918.

Application filed January 29, 1917. Serial No. 145,122.

*To all whom it may concern:*

Be it known that I, JOSEPH F. HAGAN, a citizen of the United States, residing at Electra, in the county of Wichita and State of Texas, have invented certain new and useful Improvements in Cut-Off Valves for Pipe-Lines, of which the following is a specification.

My invention relates to valves and more particularly to valves for pipe lines used by oil companies, and the object is to provide a simple valve for relieving vacuums in pipe lines. Oil companies frequently have trouble with the flow of oil on account of the formation of vacuums in the pipes and for this reason are compelled to have separate lines for different tanks. My improved valve and coöperating construction remedy the trouble with the flow of the oil as the vacuum can be broken by lifting the valve from its seat. Other objects and advantages will be fully explained in the following description and the invention will be more particularly pointed out in the claims.

Reference is had to the accompanying drawings which form a part of this application.

Figure 1 is a side elevation of the valve. Fig. 2 is a vertical section of the same. Fig. 3 is a horizontal section of the cage and a plan view of the ball and its seat. Fig. 4 is a detail view of a key which may be used for operating the lifting rod. Fig. 5 is a vertical section of a variation from the valve previously shown.

Similar characters of reference are used to indicate the same parts throughout the several views.

The valve is mounted in a casing 1 which is provided with pipe connections 2 and 3 for the inlet and outlet ends respectively. A ball 4 is mounted in a cage 5 which is provided with a cap 6 secured thereto by bolts 7. The cage 5 is also provided with a pilot 8 which is adapted to move vertically in the outlet end of the casing 1, the casing serving as a guide for the pilot. There is a seat 9 at the top of the pilot for the ball 4 and a seat 10 for the cage. The seat 10 may be provided with a gasket 11. A lifting rod 12 is screwed into the cap 6. The casing 1 is provided with a cap 13 which is secured to the casing by bolts 14 which engage a flange 15 on the upper end of the casing. The cap 13 has a boss 16 through which the lifting rod 12 moves and on which is formed a packing gland, a cap 17 being screwed on a reduced portion of the boss 16. The rod 12 projects through the cap 17. The cap 17 and the end of the lifting rod 12 are protected by a cap 18 which prevents any meddling with the lifting rod. Any suitable key may be connected with the upper end of the lifting rod for lifting this rod, the cap 18 being removed for this purpose.

In operation the oil or other fluid will come through the inlet end 2 and pass out through the outlet end 3 and the ball 4 will float in the cage 5 while the oil or other element is passing through the outlet end 3. If for any reason a vacuum is formed in the pipe below the connection 3, the cap 18 may be removed and a key attached to the lifting rod 12 so that the cage can be lifted to let the oil start to flowing. After the oil starts, the cage can be let back to its seat. The ball 4 will float on top of the oil in the cage. It is preferable to make the ball of aluminium so that it will easily float. When the oil stops flowing the ball 4 will close the passage by resting in its seat 9 in the cage. The cage is held in its seat normally by a spiral spring 19. If a vacuum has been formed in the pipe below the connection 3, the oil will not flow until the cage is lifted to unseat the valve or ball 4.

This improved valve is for use on gravity lines for oil pipe line companies. When the pipe line companies are gathering oil from the tanks at the wells on the different leases and farms, they lay one or more large pipe lines with branch lines leading from it to the different tanks. Pumps are then centrally located for causing a vacuum on the main and branch lines. As the practice is at present, the oil is taken from several different leases at the same time through the main lines and some of the tanks will become empty before others, leaving the lines open which are connected thereto and allowing air to enter the main gravity lines through the branches therefor and breaking the even vacuum and greatly retarding the flow of oil from the remaining tanks which are turned into the main lines. In trying to remedy this trouble, extra lines must be laid to take care of the air which they pull in through the open lines. When my improved valve is placed on the branch lines which lead to the tanks, it will prevent air from entering the main lines when the tanks are empty. When the valve is once seated, there would be a vacuum on the working parts of the valve when the pump should start. The idea of raising the valve is to let the oil start flowing and the valve will float on the oil until the tank is empty, and prevent air from entering the line because the valve will follow the oil down and close the pipe.

The variation shown in Fig. 5 contains a slight difference in that the joint of the cage 5' is at a different place and the casing 1' is provided with a joint 24 instead of the cap previously described. The seat 10' is slightly different from the seat 10. Instead of the protecting cap previously shown, a cap 18' is used. Lugs 22 and 23 are formed on the cap 18' and the cap is pivotally mounted in the lug 21 and caught in a lug 20 and locked therein with any suitable lock. The lugs 20 and 21 may be formed integral with the casing 1'. The inlet 2' is located at a different point and the outlet 3' is also located at a different point. A valve 27 is provided to prevent back pressure from the main lines. A seat 29 is provided for the valve 27. A casing 25 is provided for the valve 27 and the valve is provided with a stem 26 and guides 28 are formed in the casing 25 for the stem 26. The vacuum valve 4 can be used with or without the back pressure valve 27 and is found to be practical with both arrangements shown.

What I claim, is,—

1. A cut-off valve for pipe lines comprising a casing intercepting a pipe line and having inlet and outlet connections with said pipe line and closed except to said pipe line, a cage vertically movable in said casing and having a pilot vertically movable in and closing the passage through said outlet except through the cage, a valve vertically movable in said cage and closing the passage therethrough by gravity, and yielding means normally holding said cage and pilot in operative position.

2. A cut-off valve for pipe lines comprising a casing intercepting a pipe line and having inlet and outlet connections with said pipe line and closed except to said pipe line, a cage seat about said outlet opening, a cage mounted on said seat and having a hollow cylindrical pilot projecting through said seat into the outlet opening and closing said opening except through said cage, a relatively light valve closing the opening through said cage and vertically movable in said cage, and yielding means holding said cage on said seat.

3. A cut-off valve for pipe lines comprising a casing intercepting a pipe line and having inlet and outlet connections with said pipe line and closed except to said pipe line, a cage seat about said outlet opening, a cage mounted on said seat and having a hollow cylindrical pilot closing said outlet opening except through said cage and said cage having an opening for the passage of liquids therethrough, a valve lighter than liquids which are to pass through said cage adapted to close the opening through said cage by gravity, said cage having a stem projecting vertically out of said casing for lifting said cage off its seat for breaking the vacuum maintained by said valve, and means for yieldingly holding said cage on its seat.

4. A cut-off valve for pipe lines comprising a casing intercepting a pipe line and having inlet and outlet connections with said pipe line and closed except to said pipe line, a cage seat about said outlet opening, a cage mounted on said seat and having a hollow cylindrical pilot projecting down in said opening and closing the same except through said cage, a valve lighter than liquids which are to pass through said casing for closing the opening through said cage as the liquid is ceasing to pass through the cage, said cage having a stem projecting vertically through the top of the casing, a packing gland closing the passage about said stem, a cap inclosing the projecting portion of said stem and said gland, and means for yieldingly holding said cage on said seat.

In testimony whereof, I set my hand in the presence of two witnesses, this 1st day of February, 1915.

JOSEPH FRANCIS HAGAN.

Witnesses:
H. G. NEWSUM,
L. J. MARKS.

Copies of this patent may be obtained for five cents each, by addressing the "Commissioner of Patents, Washington, D. C."